(12) United States Patent  
Christiansen et al.

(10) Patent No.: US 11,064,574 B2  
(45) Date of Patent: Jul. 13, 2021

(54) INDUCTION COOKING HOB INCLUDING A COOKING AREA WITH THREE OR MORE INDUCTION COILS AND A METHOD FOR CONTROLLING A COOKING AREA

(71) Applicant: Electrolux Appliances Aktiebolag, Stockholm (SE)

(72) Inventors: Svend Erik Christiansen, Forli (IT); Filippo Martini, Forli (IT); Massimo Nostro, Forli (IT); Alex Viroli, Forli (IT); Laurent Jeanneteau, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 1028 days.

(21) Appl. No.: 14/901,965

(22) PCT Filed: Jul. 22, 2014

(86) PCT No.: PCT/EP2014/065731  
§ 371 (c)(1),  
(2) Date: Dec. 29, 2015

(87) PCT Pub. No.: WO2015/032542  
PCT Pub. Date: Mar. 12, 2015

(65) Prior Publication Data  
US 2016/0381736 A1     Dec. 29, 2016

(30) Foreign Application Priority Data  
Sep. 5, 2013   (EP) ..................... 13183161

(51) Int. Cl.  
*H05B 6/06*   (2006.01)  
*H05B 6/12*   (2006.01)

(52) U.S. Cl.  
CPC .......... *H05B 6/065* (2013.01); *H05B 6/1245* (2013.01); *H05B 6/1272* (2013.01); *H05B 2213/05* (2013.01); *Y02B 40/00* (2013.01)

(58) Field of Classification Search  
CPC .... H05B 6/065; H05B 6/1245; H05B 6/1272; H05B 2213/05; H05B 6/062; H05B 6/04;  
(Continued)

(56) References Cited

U.S. PATENT DOCUMENTS 7,759,616 B2   7/2010   Gouardo et al.  
7,910,865 B2   3/2011   Haag et al.  
(Continued)

FOREIGN PATENT DOCUMENTS

CN   102783247 A   11/2012  
DE   10207183      9/2003  
(Continued)

OTHER PUBLICATIONS

International Search Report for PCT/EP2014/065731 dated Aug. 27, 2014, 5 pages.  
(Continued)

*Primary Examiner* — Dana Ross  
*Assistant Examiner* — James F Sims, III  
(74) *Attorney, Agent, or Firm* — Pearne & Gordon LLP

(57) ABSTRACT

The present invention relates to an induction cooking hob (10) including at least one cooking area (12), wherein the cooking area (12) comprises at least three induction coils (14). The induction coils (14) of at least one cooking area (12) are arranged side-by-side and in series. Each induction coil (14) of at least one cooking area (12) has an elongated shape. The longitudinal axes of the induction coils (14) within one cooking area (12) are arranged in parallel. Each induction coil (14) of 10 the cooking area (12) is associated with a dedicated induction generator (16). The induction  
(Continued)

Figure 1:
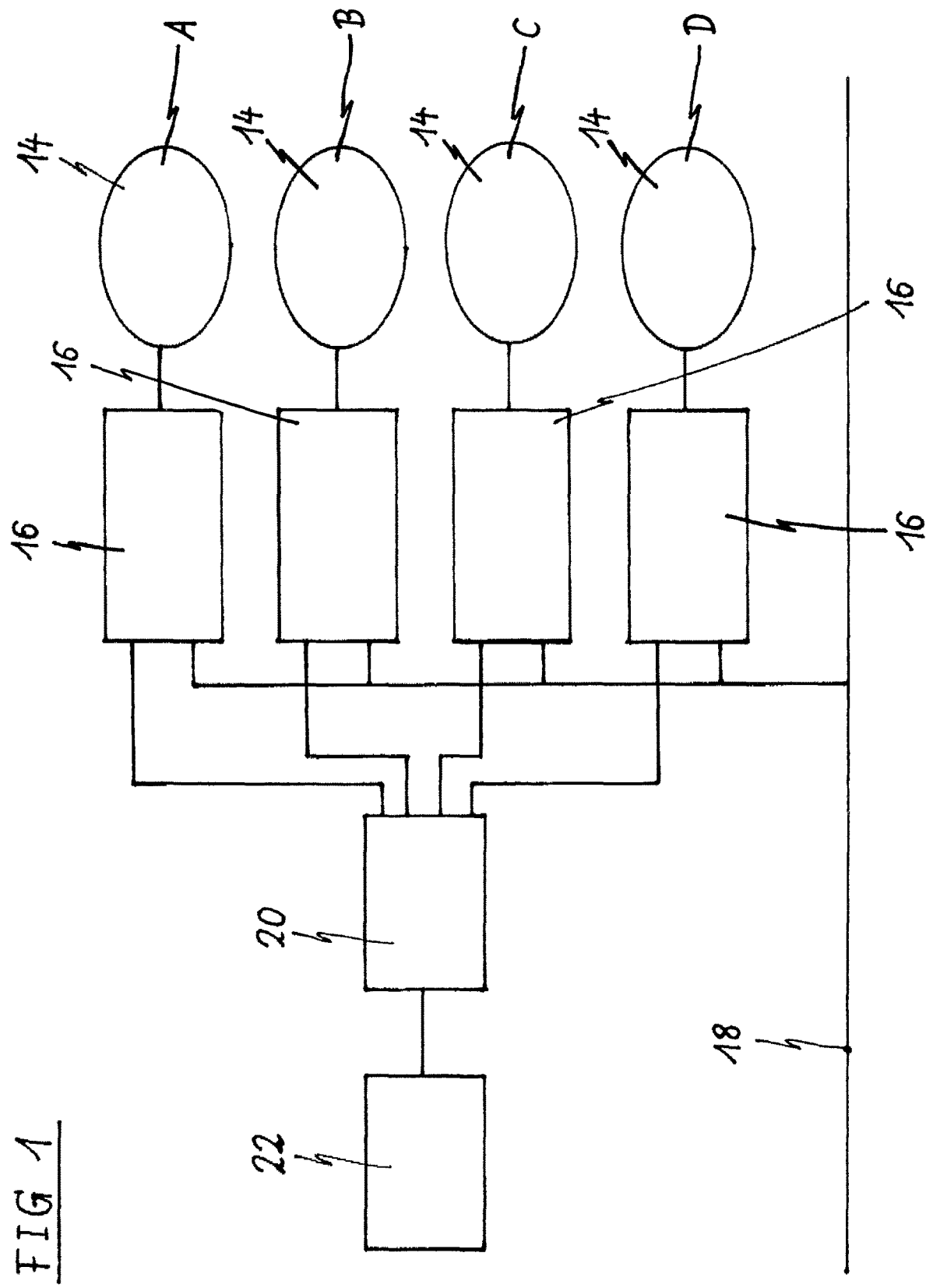

generators (16) are connected or connectable to at least one current line (18). The induction generators (16) are connected to and controlled or controllable by at least one control unit (20). Requested powers (rP) for each used induction generator (16) are adjusted or adjustable independent from each other by a user interface (22). Instant powers (iP) of the induction generators (16) within a cycle pattern (T1, T2, ..., T11) are controlled or controllable independent from each other by the control unit (20). Further, the present invention relates to a method for controlling a cooking area.

13 Claims, 2 Drawing Sheets

(58) Field of Classification Search
CPC .... H05B 6/12; H05B 2206/02; H05B 6/1209; H05B 1/0266; H05B 2203/037; H05B 2213/07; Y02B 40/126
USPC .... 219/624, 447.1, 620, 626, 518, 660, 665, 219/664, 462.1, 621, 650, 661, 675, 600
See application file for complete search history.

(56) References Cited

U.S. PATENT DOCUMENTS

| | | | |
|---|---|---|---|
| 8,026,462 B2 | 9/2011 | Arnold et al. | |
| 8,707,946 B2 | 4/2014 | Leikam et al. | |
| 8,742,299 B2 | 6/2014 | Gouardo et al. | |
| 9,006,621 B2 | 4/2015 | Artal Lahoz et al. | |
| 9,084,295 B2 | 7/2015 | Sadakata et al. | |
| 9,532,406 B2 | 12/2016 | Viroli et al. | |
| 9,532,407 B2 | 12/2016 | Viroli et al. | |
| 9,900,933 B2 | 2/2018 | Jeanneteau et al. | |
| 10,045,402 B2 | 8/2018 | Viroli et al. | |
| 10,085,304 B2 | 9/2018 | Garde et al. | |
| 2010/0282740 A1 | 11/2010 | Maestre et al. | |
| 2011/0147375 A1 | 6/2011 | Lomp | |
| 2011/0240632 A1 | 10/2011 | Anton Falcon et al. | |
| 2012/0024809 A1 | 2/2012 | Rowan et al. | |
| 2012/0024835 A1 | 2/2012 | Artal Lahoz et al. | |
| 2012/0248095 A1* | 10/2012 | Lee | H05B 6/1263 219/620 |
| 2012/0248098 A1* | 10/2012 | Lee | H05B 6/065 219/660 |
| 2012/0318786 A1 | 12/2012 | Casanova Lacueva et al. | |
| 2012/0321762 A1 | 12/2012 | Aranda Vazquez et al. | |
| 2015/0008216 A1 | 1/2015 | Pippia | |
| 2015/0156824 A1 | 6/2015 | Viroli et al. | |
| 2016/0037589 A1* | 2/2016 | Altamura | F24C 15/106 219/447.1 |
| 2017/0181228 A1 | 6/2017 | Franco Gutierrez et al. | |
| 2017/0285926 A1 | 10/2017 | Brasseur et al. | |
| 2018/0098387 A1 | 4/2018 | Aranda Vazquez et al. | |

FOREIGN PATENT DOCUMENTS

| | | | |
|---|---|---|---|
| DE | 102006024739 | 11/2007 | |
| DE | 102006054973 | 5/2008 | |
| DE | 102012211399 A1 | 1/2013 | |
| EP | 1610590 | 12/2005 | |
| EP | 2007174 | 12/2008 | |
| EP | 2034800 A1 * | 3/2009 | ........... H05B 1/0266 |
| EP | 2211591 | 7/2010 | |
| EP | 2389045 | 11/2011 | |
| EP | 2440008 | 4/2012 | |
| EP | 2440012 | 4/2012 | |
| EP | 2445310 | 4/2012 | |
| EP | 2480046 | 7/2012 | |
| EP | 2506668 | 10/2012 | |
| EP | 2506671 | 10/2012 | |
| EP | 2683215 | 1/2014 | |
| EP | 2688365 | 1/2014 | |
| EP | 2688366 | 1/2014 | |
| EP | 2833697 | 2/2015 | |
| EP | 2840867 | 2/2015 | |
| EP | 3012728 | 4/2016 | |
| ES | 2432235 | 12/2013 | |
| FR | 2863039 | 6/2005 | |
| JP | 2009099299 | 5/2009 | |
| JP | 2011003491 | 1/2011 | |
| WO | 2005069688 | 7/2005 | |
| WO | 2006117182 | 11/2006 | |
| WO | 2007082563 | 7/2007 | |
| WO | 2008061908 | 5/2008 | |
| WO | 2008122495 | 10/2008 | |
| WO | 2009016124 | 2/2009 | |
| WO | 2009049989 | 4/2009 | |
| WO | 2009053279 | 4/2009 | |
| WO | 2010069616 | 6/2010 | |
| WO | 2010084096 | 7/2010 | |
| WO | 2010089809 | 8/2010 | |
| WO | 2011107324 | 9/2011 | |
| WO | 2011107325 | 9/2011 | |
| WO | 2012095732 | 7/2012 | |
| WO | 2015015360 | 2/2015 | |
| WO | 2015015361 | 2/2015 | |

OTHER PUBLICATIONS

Office action issued in corresponding Chinese patent application No. 201480042025.6 dated May 17, 2018, 6 pages.
Brazilian Office action for application No. BR112016003190-3, dated Mar. 2, 2020, 4 pages.

* cited by examiner

INDUCTION COOKING HOB INCLUDING A COOKING AREA WITH THREE OR MORE INDUCTION COILS AND A METHOD FOR CONTROLLING A COOKING AREA

The present invention relates to an induction cooking hob including at least one cooking area comprises at least three induction coils. Further, the present invention relates to a method for controlling a cooking area.

On cooking hobs, in particular on induction cooking hobs, there is a present trend that the cooking zones are not arranged in fixed places, but are flexibly put together by one or more heating elements. Cookware may be put onto an arbitrary position of the cooking area by the user. A pot detection device recognizes said position, so that the heating elements below the cookware may be activated.

However, it is difficult to set the appropriate powers for the relevant heating elements. Further, audible interference may be generate, if the difference between the instant powers of adjacent activated induction coils corresponds with differences between frequencies within the range of audible interference.

It is an object of the present invention to provide an improved induction cooking hob with a cooking area and an improved method for controlling the power of the induction coils of the cooking area.

The object of the present invention is achieved by the induction cooking hob according to claim 1.

The induction cooking hob according to the present invention includes at least one cooking area, wherein:
the cooking area comprises at least three induction coils,
the induction coils of at least one cooking area are arranged side-by-side,
each induction coil of at least one cooking area has an elongated shape,
the longitudinal axes of the induction coils within one cooking area are arranged in parallel,
each induction coil of the cooking area is associated with a dedicated induction generator,
the induction generators are connected or connectable to at least one current line,
the induction generators are connected to and controlled or controllable by at least one control unit,
requested powers for each used induction generator are adjusted or adjustable independent from each other by a user interface, and
instant powers of the induction generators within a cycle pattern are controlled or controllable independent from each other by the control unit.

The main idea of the present invention is the geometric properties of the cooking area and the induction coils on the one hand and the dedicated induction generator for each induction coil of the cooking area on the other hand. The geometric properties of the cooking area and the induction coils allow a number of arrangements of cookware with different shapes. The dedicated induction generator for each induction coil allows an independent setting of power of each induction coil.

Preferably, the induction coils of at least one cooking area have an oval and/or elliptical shape.

For example, the induction generators are connected or connectable to the same current line.

Alternatively, the induction generators are connected or connectable to at least two different current lines, wherein said current lines have different phases.

Further, the control unit may be provided for performing at least one cooking mode, wherein the activated induction coils work with one single setting of the requested power.

Moreover, the control unit may be provided for performing at least one cooking mode with at least two different settings of requested powers, wherein at least one activated induction coil works with the setting of one requested power and at least one other activated induction coil works with the setting of another requested power.

In particular, the cooking area comprises four induction coils.

Furthermore, the induction cooking hob may comprise a number of pot detection devices, wherein each induction coil is associated to at least one pot detection device.

The object of the present invention is further achieved by the method according to claim 9.

According to the present invention, the method is provided for controlling a cooking area on an induction cooking hob, wherein the cooking area comprises at least three induction coils and said method comprises the steps of:
setting a requested power for each used induction coil by a user interface,
selecting a number of subsequent cycle patterns from a table stored in a memory of a control unit,
defining activated and deactivated induction coils by each selected cycle pattern,
determining a cycle time for each selected cycle pattern and a power balance between the activated induction coils, so that a desired average power for each induction coil is obtained over a period of one or more selected cycle patterns, and
the sum of the instant powers of the activated induction coils within each selected cycle pattern is equal to the sum of the requested powers for each used induction coil.

Preferably, the difference between the instant powers of adjacent activated induction coils is small enough, so that the difference between frequencies associated to the instant powers avoids the generation of audible interference. In particular, the difference between said frequencies is less than 1000 Hz.

Further, the desired average power for each induction coil over the period of one or more selected cycle patterns may be equal to the requested power for said induction coil.

Preferably, as many induction coils as possible are activated within one cycle patterns.

In a similar way, the instant powers of the activated induction coils may be as low as possible.

In particular, variations of the instant powers of the activated induction coils are as low as possible.

At last, the method is provided for the induction cooking hob mentioned above.

Novel and inventive features of the present invention are set forth in the appended claims.

Figure 2:
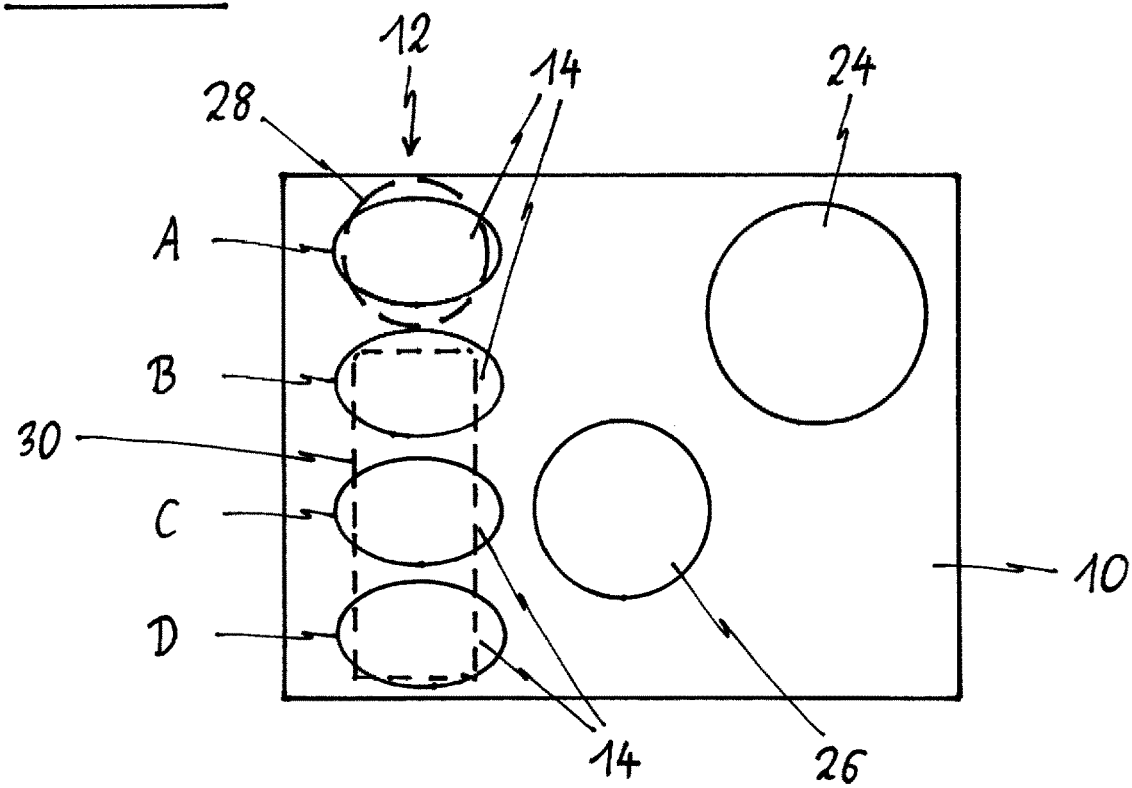
Figure 3:
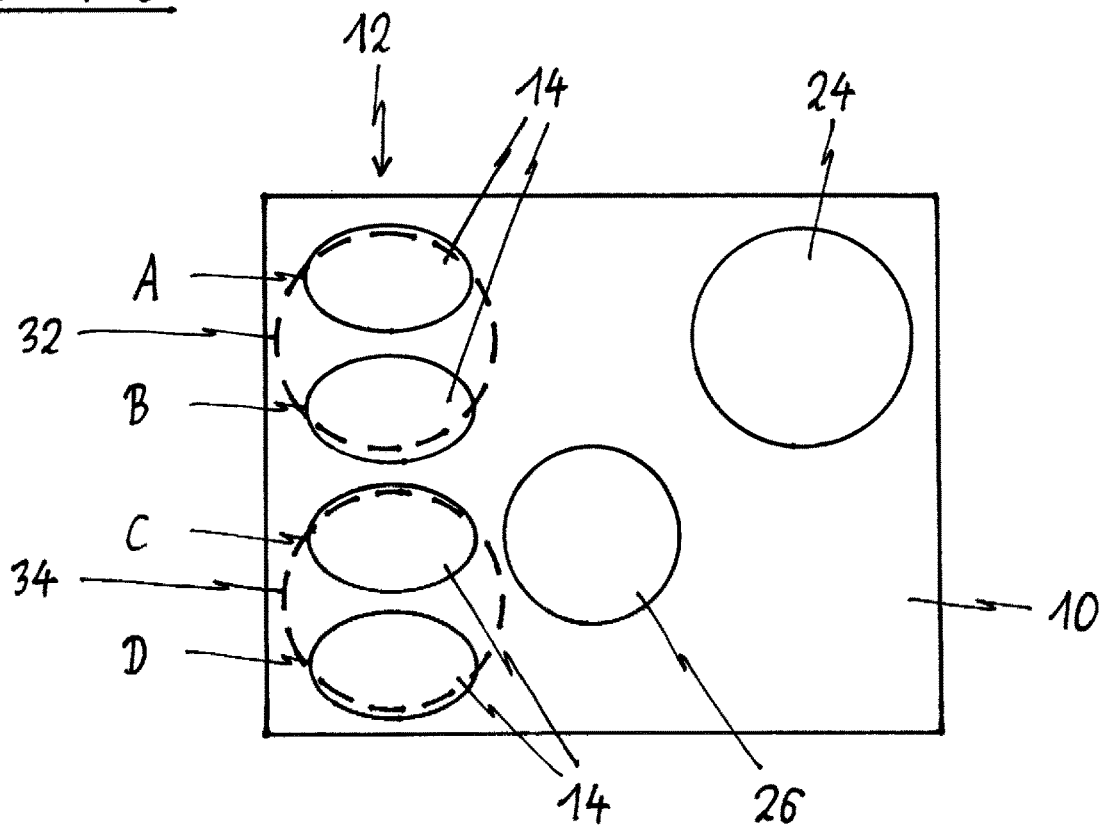

The present invention will be described in further detail with reference to the accompanied drawings, in which FIG. 1 illustrates a schematic circuit diagram of a cooking area for an induction cooking hob according to a preferred embodiment of the present invention, FIG. 2 illustrates a schematic top view of the induction cooking hob according to the preferred embodiment of the present invention, and FIG. 3 illustrates a further schematic top view of the induction cooking hob according to the preferred embodiment of the present invention.

FIG. 1 illustrates a schematic circuit diagram of a cooking area 12 for an induction cooking hob 10 according to a preferred embodiment of the present invention.

The cooking area 12 comprises four induction coils 14 arranged side-by side. In this example, the four induction coils 14 form a line. A first, second, third and fourth induction coil 14 is denoted by the letter A, B, C and D, respectively. Further, the cooking area 12 comprises four induction generators 16, a current line 18, a control unit 20 and a user interface 22. The current line 18 is provided for supplying rectified mains voltage. The current line 18 is connected to power input terminals of the four induction generators 16. Each induction generator 16 corresponds with one induction coil 14. An output terminal of each induction generator 16 is connected to the associated induction coil 14. The user interface 22 is connected to an input terminal of the control unit 20. Four output terminals of the control unit 20 are connected to corresponding control input terminals of the induction generators 16. For example, the induction generator 16 is realized by a half-bridge inverter. Each induction coil 14 is associated to at least one pot detection device.

By operating the user interface 22 different cooking modes can be selected by a user. For example, the user interface 22 may comprise dedicated touch keys for said cooking modes. In a preferred embodiment the following four cooking modes are provided. According to a first cooking mode, the four induction coils A, B, C and D work with one single power setting. According to a second cooking mode, the four induction coils A, B, C and D work with two different power settings, wherein the first and second induction coils A and B work with one power setting and the third and fourth induction coils C and D work with another power setting. According to a third cooking mode, the four induction coils A, B, C and D work with two different power settings, wherein the first induction coil A works with one power setting and the second, third and fourth induction coils B, C and D work with another power setting. According to a fourth cooking mode, the four induction coils A, B, C and D work with two different power settings, wherein the first, second and third induction coils A, B and C work with one power setting and the fourth induction coil D works with another power setting. The third and fourth cooking modes are the same in view of a functional aspect.

In the first cooking mode, the induction coils 14 covered by cookware are activated at the same working frequency in order to cancel acoustic interference noise. However, in the second, third and fourth cooking modes, the induction coils 14 are affected by different power settings and therefore by different frequencies, so that acoustic interference noise has to be avoided. The acoustic interference noise occurs, if the frequency difference between adjacent induction coils 14 is within the audible range of the human ear. Since the power is set by the user, the frequency depends on the power setting, so that often the frequency difference may be within the audible range.

In order to avoid the acoustic interference noise, the induction coils 14 are activated and deactivated according to a number of subsequent cycle patterns T1 to T11, in which not all of the induction coils 14 are activated during the same time. The sum of the instant powers iP of the activated induction coils 14 is kept in such a way that the differences of the instant powers iP between the cycle patterns T1 to T11 are small. In general, the variance of the instant powers iP must be small enough in order to comply with existing norms for flickering on the current line 18. The used cycle patterns T1 to T11 are structured in such a way that adjacent activated induction coils 14 have a small or no frequency difference. In contrast, the activated induction coils 14, which are not adjacent, may have different frequencies and powers.

The induction coils 14 activated at a certain time should have a total instant power iP, which is equal to the sum of all requested powers rP. However, a variation of the total instant power iP between the cycle patterns T1 to T11 may be allowed with the scope of the EMC norms.

The following table illustrates the possible combinations of activated and deactivated induction coils A, B, C and D, in which two, three or four of the induction coils A, B, C and D are activated at the same time. The first induction coil A is adjacent to the second induction coil B, in turn the second induction coil B is adjacent to the third induction coil C, and the third induction coil C is adjacent to the fourth induction coil D, as shown in FIG. 1. The second line to the fifth line of said table indicate the activated and deactivated states of the induction coils A, B, C and D, respectively. The eleven different cycle patterns are denoted by T1 to T11 in the first line. The last line of the table indicates the number N of the simultaneously activated induction coils A, B, C and D.

|   | T1 | T2 | T3 | T4 | T5 | T6 | T7 | T8 | T9 | T10 | T11 |
|---|----|----|----|----|----|----|----|----|----|-----|-----|
| A | x  | x  | x  | x  |    | X  |    | x  |    |     | x   |
| B | x  | x  | x  |    | x  |    | x  | x  |    | X   |     |
| C | x  | x  |    | x  | x  | X  |    |    | x  | X   |     |
| D | x  |    | x  | x  | x  |    | x  |    | x  |     | x   |
| N | 4  | 3  | 3  | 3  | 3  | 2  | 2  | 2  | 2  | 2   | 2   |

A number of the cycle patterns T1 to T11 is selected from the above table. A relative cycle time t for each selected cycle pattern T1 to T11 and a power balance between the induction coils A, B, C and D is set in such a way, that the desired average power for each induction coil A, B, C and D is achieved over one or more cycle patterns T1 to T11. The instant power iP of the individual induction coils A, B, C and D depends on the number of activated induction coils A, B, C and D, the selected power balance and the total requested power rP. It is preferred, that as many induction coils A, B, C and D as possible are activated within the given cycle pattern T1 to T11, so that the variation of the instant powers iP of the induction coils A, B, C and D are minimized, and that the power is uniform.

The following table illustrates the default individual duty settings of the induction coils A, B, C and D for each cycle pattern T1 to T11. The numerical values in the second line to the fifth line of said table indicate the percentages of the power of the induction coils A, B, C and D, respectively. The last line of the table indicates the number N of the simultaneously activated induction coils A, B, C and D.

|   | T1   | T2   | T3   | T4   | T5   | T6  | T7  | T8  | T9  | T10 | T11 |
|---|------|------|------|------|------|-----|-----|-----|-----|-----|-----|
| A | 0.25 | 0.33 | 0.33 | 0.33 |      | 0.5 |     | 0.5 |     |     | 0.5 |
| B | 0.25 | 0.33 | 0.33 |      | 0.33 |     | 0.5 | 0.5 |     | 0.5 |     |
| C | 0.25 | 0.33 |      | 0.33 | 0.33 | 0.5 |     |     | 0.5 | 0.5 |     |
| D | 0.25 |      | 0.33 | 0.33 | 0.33 |     | 0.5 |     | 0.5 |     | 0.5 |
| N | 4    | 3    | 3    | 3    | 3    | 2   | 2   | 2   | 2   | 2   | 2   |

In particular, the cycle patterns T6, T7 and T11 can be selected as the preferred last cycle patterns, wherein the power balance between two activated induction coils A, B, C and/or D can be adjusted in order to achieve the desired power distributions. The activated induction coils A, B, C and/or D of the cycle patterns T6, T7 and T11 are not adjacent. Thus, the activated induction coils A, B, C and/or D of the cycle patterns T6, T7 and T11 may have arbitrary frequencies without generating acoustic interference noise.

According to a first example, the requested power rP for the first induction coil A is rP=100 W, for the second induction coil B is rP=150 W, for the third induction coil C is rP=350 W, and for the fourth induction coil D is rP=400 W.

In said first example, the method of selecting the cycle patterns and setting the duty are performed as follows. A cycle pattern with three activated induction coils B, C and D is selected, wherein the induction coil A is omitted, which has a requested power rP closest to the difference between the highest and second highest requested power rP. A further cycle pattern is selected with two activated induction coils C and D having the highest and second highest requested power rP until the power is reach for the second highest power. Another cycle pattern is selected with two activated induction coils A and D having the highest requested power iP and the biggest distance from each other. The power balance of the activated induction coils A and D is adjusted in order to reach the requested power rP. Thus, the cycle patterns T5, T9 and T11 are selected.

The relative cycle time t of the cycle pattern T5 is calculated in such a way, that the lowest requested power rP of the activated induction coils B, C or D is reached. This is the requested power rP=150 W for the second induction coil B. Further, the sum of the instant powers iP of the activated induction coils B, C and D is equal to the sum of the requested powers rP for the induction coils A, B, C and D, which is rP=1000 W. The relative cycle time t of the cycle pattern T5 is given by:

$t(T5)=iP(B)/(rP(A,B,C,D)/3)=150\ W/(1000\ W/3)=0.45$

The relative cycle time t of the cycle pattern T9 is calculated in such a way, that the instant power iP of the third induction coil C during the cycle pattern T5 is reached. Said instant power iP of the third induction coil C during the cycle pattern T5 is given by:

$iP(C;T5)=(rP(A,B,C,D)/3)*t(T5)=(1000\ W/3)*0.45=150\ W$

In the cycle pattern T9 there are two activated induction coils C and D, so that the instant power iP of each activated induction coil C and D is given by:

$iP(C)=iP(D)=rP(A,B,C,D)/2=1000\ W/2=500\ W.$

The remaining power of the third induction coil C during the cycle pattern T9 is given by:

$iP(C;T9)=rP(C)-iP(C;T5)*t(T5)=200\ W$

The relative cycle time t of the cycle pattern T9 is given by:

$t(T9)=iP(C;T9)/(rP(A,B,C,D)/2)=200\ W/(1000\ W/2)=0.4$

The relative cycle time t of the cycle pattern T11 is given as the remaining time.

$t(T11)=1-t(T5)-t(T9)=1-0.45-0.40=0.15$

Since the two remaining activated induction coils A and D are not adjacent, the power balance of said two induction coils A and D can be arbitrarily adjusted in order to obtain the desired power for both induction coils A and D. The instant powers iP of the activated induction coil A and D are given by $iP(A;T11)=rP(A)/t(T11)=100\ W/0.15=666.7\ W$ $iP(D;T11)=1-iP(A;T11)=333.3\ W$ The actual power aP of the fourth induction coil can be verified by:

$aP(D)=1000\ W*(0.45/3+0.4/2)+333.3\ W*0.15=400\ W$

The following table illustrates the relative cycle times t, the instant powers iP, the actual powers aP and the requested powers rP of the cycle patterns T1 to T11 according to the first example.

|  | T1 | T2 | T3 | T4 | T5 | T6 | T7 | T8 | T9 | T10 | T11 | aP | rP |
|---|---|---|---|---|---|---|---|---|---|---|---|---|---|
| t | 0 | 0 | 0 | 0 | 0.45 | 0 | 0 | 0 | 0.40 | 0 | 0.15 | | |
| iP(A) | | | | | 0 | | | | 0 | | 666.7 | 100 | 100 |
| iP(B) | | | | | 333 | | | | 0 | | 0 | 150 | 150 |
| iP(C) | | | | | 333 | | | | 500 | | 0 | 350 | 350 |
| iP(D) | | | | | 333 | | | | 500 | | 333.3 | 400 | 400 |
| Sum | | | | | 1000 | | | | 1000 | | 1000 | 1000 | 1000 |

According to a second example, the cooking zones associated to the second, third and fourth induction coils B, C and D are always linked. In the second example, other combinations of cycle patterns are used.

FIG. 2 illustrates a schematic top view of the induction cooking hob 10 according to the preferred embodiment of the present invention. A small cooking vessel 28 and a big cooking vessel 30 are arranged on the induction cooking hob 10. FIG. 2 relates to the second example.

The induction cooking hob 10 comprises a cooking area 12 including the four induction coils 14 arranged in series. Moreover, the induction cooking hob 10 comprises two further induction coils 24 and 26. The four induction coils 14 are elliptical, while the further induction coils 24 and 26 are circular. The longitudinal axes of the four induction coils 14 are arranged in parallel. The small cooking vessel 28 is arranged above the first induction coil A, while the big cooking vessel 30 is arranged above the second, third and fourth induction coils B, C and D. The positions of the small cooking vessel 28 and the big cooking vessel 30 relates to the second example.

The second example differs between two cases. In a first case the power setting of the first induction coil A is lower than the individual requested powers rP of the other induction coils B, C and D, while in a second case the power setting of the first induction coil A is higher than the individual requested powers rP of the other induction coils B, C and D.

In the first case the cycle patterns T1 and T5 are applied. The cycle pattern T1 is applied until the requested power for the first induction coil A is reached, while the cycle pattern T5 is applied during the rest of the time.

The sum of the instant powers iP of all activated induction coils A, B, C and/or D is always equal to the sum of the requested powers rP. In the cycle pattern T1 there are four activated induction coils A, B, C and D, so that the instant powers of each induction coil A, B, C and D is a quarter of the sum of the requested powers. The sum of the requested powers rP is:

$$rP(A,B,C,D)=100\ W+300\ W+300\ W+300\ W=1000\ W$$

The relative cycle time t of the cycle pattern T1 is given by:

$$t(T1)=iP(A)/(rP(A,B,C,D)/4)=100\ W/(1000\ W/4)=0.4$$

The remaining relative cycle time t of the cycle pattern T5 is given by:

$$t(T5)=1-t(T1)=1-0.4=0.6$$

The following table illustrates the relative cycle times t, the instant powers iP, the actual power aP and the requested powers rP of the cycle patterns T1 to T11 according to the first case of the second example.

|       | T1   | T2 | T3 | T4 | T5    | T6 | T7 | T8 | T9 | T10 | T11 | aP   | rP   |
|-------|------|----|----|----|-------|----|----|----|----|-----|-----|------|------|
| t     | 0.4  | 0  | 0  | 0  | 0.6   | 0  | 0  | 0  | 0  | 0   | 0   | 1    |      |
| iP(A) | 250  |    |    |    |       |    |    |    |    |     |     | 100  | 100  |
| iP(B) | 250  |    |    |    | 333.3 |    |    |    |    |     |     | 300  | 300  |
| iP(C) | 250  |    |    |    | 333.3 |    |    |    |    |     |     | 300  | 300  |
| iP(D) | 250  |    |    |    | 333.3 |    |    |    |    |     |     | 300  | 300  |
| Sum   | 1000 |    |    |    | 1000  |    |    |    |    |     |     | 1000 | 1000 |

In the second case the power setting of the first induction coil A is higher than the individual requested powers rP of the other induction coils B, C and D.

In the second case the cycle patterns T2 and T11 are applied. The cycle pattern T2 is applied until the requested powers for the second and third induction coils B and C are reached. In the cycle pattern T11 the instant powers of the first and fourth induction coils A and D are matched in order to obtain the requested powers for said first and fourth induction coils A and D.

The sum of the instant powers iP is always equal to the sum of the requested powers rP. In the cycle pattern T2 there are three activated induction coils A, B and C, so that the instant power of each induction coil A, B and C is a third of the sum of the requested powers. The sum of the requested powers rP is:

$$rP(A,B,C,D)=300\ W+100\ W+100\ W+100\ W=600\ W$$

The instant power iP of each induction coil A, B and C during the cycle pattern T2 is $$iP(A)=iP(B)=iP(C)=rP(A,B,C,D)/3=200\ W$$

The relative cycle time t of the cycle pattern T2 is given by:

$$t(T2)=rP(B)/(rP(A,B,C,D)/3)=100\ W/(600\ W/3)=0.5$$

The remaining relative cycle time t of the cycle pattern T11 is given by:

$$t(T11)=1-t(T2)=1-0.5=0.5$$

Since the two remaining activated induction coils A and D are not adjacent, the power balance of said two induction coils A and D can be arbitrarily adjusted in order to obtain the desired power for both induction coils A and D.

The instant powers iP of the activated induction coil A and D are given by $$iP(D;T11)=rP(D)/t(T11)=100\ W/0.5=200\ W$$

$$iP(A;T11)=rP(A,B,C,D)-iP(D;T11)=600\ W-200\ W=400\ W$$

The actual power aP of the first induction coil A can be verified by:

$$aP(A)=(600\ W*0.5)/3+(400\ W*0.5)=300\ W$$

The following table illustrates the relative cycle times t, the instant powers iP, the actual powers aP and the requested powers rP of the cycle patterns T1 to T11 according to the second case of the second example.

|       | T1 | T2  | T3 | T4 | T5 | T6 | T7 | T8 | T9 | T10 | T11 | aP  | rP  |
|-------|----|-----|----|----|----|----|----|----|----|-----|-----|-----|-----|
| t     | 0  | 0.5 | 0  | 0  | 0  | 0  | 0  | 0  | 0  | 0   | 0.5 | 1   |     |
| iP(A) |    | 200 |    |    |    |    |    |    |    |     | 400 | 300 | 300 |
| iP(B) |    | 200 |    |    |    |    |    |    |    |     |     | 100 | 100 |
| iP(C) |    | 200 |    |    |    |    |    |    |    |     |     | 100 | 100 |
| iP(D) |    |     |    |    |    |    |    |    |    |     | 200 | 100 | 100 |
| Sum   |    | 600 |    |    |    |    |    |    |    |     | 600 | 600 | 600 |

FIG. 3 illustrates a further schematic top view of the induction cooking hob according to the preferred embodiment of the present invention. Two medium cooking vessels 32 and 34 are arranged on the induction cooking hob 10. FIG. 3 relates to an example with two current lines on different phases.

The induction cooking hob 10 comprises the cooking area 12 including the four induction coils 14 arranged in series. Additionally, the induction cooking hob 10 comprises the two further induction coils 24 and 26. The four induction coils 14 are elliptical, while the further induction coils 24 and 26 are circular. The longitudinal axes of the four induction coils 14 are arranged in parallel. A first medium cooking vessel 32 is arranged above the first induction coil A and the second induction coil B, while a second medium cooking vessel 34 is arranged above the third induction coil C and the fourth induction coil D. The first induction coil A and the second induction coil B are supplied by a first current line, while the third induction coil C and the fourth induction coil D are supplied by a second current line, wherein the first and second current lines are on different phases.

In order to avoid the acoustic interference noise, the adjacent induction coils A, B, C and/or D cannot be activated at the same time with a frequency difference within the audible range. The sum of the instant powers iP of the first and second induction coils A and B should be constant. In a similar way, the sum of the instant powers iP of the third and fourth induction coils C and D should also be constant.

The following table illustrates the possible cycle patterns T1 to T3.

|   | T1 | T2 | T3 |
|---|----|----|----|
| A | x  | x  |    |
| B | x  |    | x  |
| C | x  | x  |    |
| D | x  |    | x  |

The following table illustrates the relative cycle times t, the instant powers iP, the actual powers aP and the requested powers rP of the cycle patterns T1 to T3 according to an example, in which the first induction coil A and the second induction coil B are supplied by the first current line, while the third induction coil C and the fourth induction coil D are supplied by the second current line, wherein the first and second current lines are on different phases.

|       | T1  | T2  | T3  | aP  | rP  |
|-------|-----|-----|-----|-----|-----|
| t     | 0   | 0.5 | 0.5 |     |     |
| iP(A) | 350 | 980 | 0   | 490 | 500 |
| iP(B) | 350 | 0   | 980 | 490 | 500 |
| iP(C) | 350 | 420 | 0   | 210 | 200 |
| iP(D) | 350 | 0   | 420 | 210 | 200 |
| Sum   | 1400| 1400| 1400|     | 1400|

If the sum of the requested powers rP of the first induction coil A and the second induction coil B is equal or about equal to the sum of the requested powers rP of the third induction coil C and the fourth induction coil D, then the cycle pattern T1 is applied the full time. However, if the above requested powers are different, then the cycle patterns T2 and T3 are applied, wherein the relative cycle time t is 0.5 or 50%. The sum of the instant powers iP of the first induction coil A and the second induction coil B is equal to the sum of the corresponding requested powers rP. In a similar way, the sum of the instant powers iP of the third induction coil C and the fourth induction coil D is equal to the sum of the corresponding requested powers rP.

Another application of the present invention is the activation of a further cooking mode, wherein the requested power (rP) changes automatically according to the position of the cooking vessel on the cooking area. The system performs a pot detection on all coils in the cooking area. Depending on which coil or coils) that is (are) covered by the cooking vessel, power is applied to the coil (coils) according to a preset pattern. The requested power (rP) can for instance be low, for example about 400 W, if the cooking vessel is placed on one of the extreme parts of the cooking area. In contrast, the requested power (rP) can be high, for example about 3000 W, if the cooking vessel is placed on the other (opposite) extreme part of the cooking area. At last, the requested power (rP) can have an average value, if the cooking vessel is placed on a central portion of the cooking area, between the extreme parts. A user could be allowed to change the preset pattern from the user interface to obtain the best pattern for the cooking needs at every instance. Applied on the embodiment in FIG. 1, pair of coils could be utilised as the defining regions of preset power, e.g. if a vessel is placed on coils A+B a high power is applied, if placed on coils B+C a medium power I applied and if placed on coils C+D a low power is applied. Naturally, other combinations are possible. If a cooking vessel is moved or removed, a new pot detection can be performed to ensure that only the relevant coil or coils are actine.

LIST OF REFERENCE NUMERALS 10 induction cooking hob
12 cooking area
14 induction coil
16 induction generator
18 current line
20 control unit
22 user interface
24 further induction coil
26 further induction coil
28 small cooking vessel
30 big cooking vessel
32 medium cooking vessel
34 medium cooking vessel
A first induction coil
B second induction coil
C third induction coil
D fourth induction coil
N number of activated inductions coils
Tn cycle pattern
t relative cycle time
iP instant power
aP actual power
rP requested power

The invention claimed is:

1. An induction cooking hob including at least one cooking area, wherein:
the at least one cooking area comprises at least three induction coils,
the induction coils of the at least one cooking area are arranged side-by-side,
each induction coil of the at least one cooking area has an elongated shape,
respective longitudinal axes of the induction coils within the at least one cooking area are arranged in parallel,
each induction coil of the at least one cooking area is associated with a dedicated induction generator,
the induction generators are connected to at least one current line, the induction generators are connected to and controlled by a control unit,
requested powers for each used induction generator are adjusted independent from each other by a user interface,
the control unit is configured to control instant powers of the induction generators within each cycle pattern of a plurality of cycle patterns independent from each other, wherein each of the cycle patterns defines whether each of the induction coils are simultaneously activated or deactivated,
the control unit is configured to select at least one of the cycle patterns of the plurality of cycle patterns, and wherein a sum of the instant powers of activated induction coils within each selected cycle pattern is equal to a sum of the requested powers for each activated induction coil, and the selected cycle patterns are structured such that adjacent activated induction coils have no frequency difference, while the activated induction coils, which are not adjacent, have different frequencies.

2. The induction cooking hob according to claim 1, wherein the induction coils of the at least one cooking area have an oval and/or elliptical shape.

3. The induction cooking hob according to claim 1, wherein the induction generators are connected to the same current line.

4. The induction cooking hob according to claim 1, wherein the induction generators are connected to at least two different current lines, wherein said current lines have different phases.

5. The induction cooking hob according to claim 1, wherein the control unit is provided for performing at least one cooking mode, wherein the activated induction coils work with one single setting of the requested power.

6. The induction cooking hob according to claim 1, wherein the control unit is provided for performing at least one cooking mode with at least two different settings of requested powers, wherein at least one activated induction coil works with the setting of one requested power and at least one other activated induction coil works with the setting of another requested power.

7. The induction cooking hob according to claim 1, wherein the at least one cooking area comprises four induction coils.

8. The induction cooking hob according to claim 1, wherein the induction cooking hob comprises a number of pot detection devices, wherein each said induction coil is associated to at least one pot detection device.

9. The induction cooking hob according to claim 1, wherein the plurality of cycle patterns is stored in a memory of the control unit.

10. An induction cooking hob comprising:
a first cooking zone having a first induction coil and a first pot detection device for detecting when a pot is placed above the first induction coil in the first cooking zone;
a second cooking zone having a second induction coil and a second pot detection device for detecting when a pot is placed above the second induction coil in the second cooking zone; and
at least one control unit operatively coupled to each of the first and second induction coils and the first and second pot detection devices, said at least one control unit being configured in a predetermined cooking mode to apply a first predetermined power to the first induction coil upon detecting a pot in the first cooking zone, and deactivate the first induction coil upon detecting that the pot has been removed from the first cooking zone, and to apply a second predetermined power higher than the first predetermined power to the second induction coil upon detecting the pot in the second cooking zone and to deactivate the second induction coil upon detecting that the pot has been removed from the second cooking zone,
wherein cooking power supplied to the pot is automatically adjustable between said first and second predetermined powers by sliding said pot across the induction cooking hob from said first cooking zone to said second cooking zone and from said second cooking zone to said first cooking zone, respectively.

11. The induction cooking hob according to claim 10, said predetermined cooking mode being user-selectable via a dedicated key of a user interface of said hob.

12. The induction cooking hob according to claim 11, said first predetermined power and said second predetermined power also being user-selectable via said user interface.

13. An induction cooking hob comprising:
a first cooking zone and a second cooking zone having respective first and second induction coils;
a pot detection system configured to detect when a pot is located in each of the aforementioned cooking zones; and
a controller configured to activate each of the coils only when a pot is located in the respective cooking zone, the first induction coil being activated at a first power level and the second induction coil being activated at a second power level higher than the first power level,
wherein cooking power to the pot is automatically adjustable between the first and second power levels by sliding the pot across the cooking hob from the first cooking zone to the second cooking zone and from the second cooking zone to the first cooking zone, respectively.

* * * * *